United States Patent
Vangpat et al.

(10) Patent No.: US 8,566,917 B2
(45) Date of Patent: Oct. 22, 2013

(54) EFFICIENT SINGLE SIGN-ON AND IDENTITY PROVIDER CONFIGURATION AND DEPLOYMENT IN A DATABASE SYSTEM

(75) Inventors: Alan Vangpat, Pittsburgh, PA (US); Harsimranjit Chabbewal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 288 days.

(21) Appl. No.: 12/979,557

(22) Filed: Dec. 28, 2010

(65) Prior Publication Data

US 2011/0231919 A1  Sep. 22, 2011

Related U.S. Application Data

(60) Provisional application No. 61/315,776, filed on Mar. 19, 2010, provisional application No. 61/352,289, filed on Jun. 7, 2010.

(51) Int. Cl.
H04L 29/06 (2006.01)

(52) U.S. Cl.
USPC .......................................................... 726/8

(58) Field of Classification Search
USPC .......................................................... 726/8
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

OTHER PUBLICATIONS

Wang Bin; Huang He Yuan; Liu Xiao Xi; Xu Jing Min; "Open Identity Management Framework for SaaS Ecosystem," e-Business Engineering, pp. 512-517 (IEEE Oct. 23, 2009).*

(Continued)

Primary Examiner — Jung Kim
Assistant Examiner — Theodore Parsons
(74) Attorney, Agent, or Firm — Ingrassia Fisher & Lorenz, P.C.

(57) ABSTRACT

Various techniques and procedures related to user authentication, identity providers, and single sign-on (SSO) are presented here. One approach creates an SSO link between two organizations in a streamlined manner using an internal cross-user systemwide digital certificate, and without processing any user-created, user-uploaded, or user-assigned digital certificates. Another approach presented here configures an identity provider service for an entity or organization by processing a single user command. The identity provider service is automatically configured in the background without processing any additional user commands, user instructions, or user-entered data.

17 Claims, 5 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,271,536 B2* | 9/2012 | Amradkar et al. ............ 707/802 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0023880 A1* | 1/2003 | Edwards et al. ............ 713/201 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominguez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0171872 A1* | 8/2005 | Burch et al. ............ 705/29 |
| 2005/0223022 A1 | 10/2005 | Weissman et al. |
| 2005/0283478 A1 | 12/2005 | Choi et al. |
| 2006/0080352 A1* | 4/2006 | Boubez et al. ............ 707/102 |
| 2006/0136990 A1* | 6/2006 | Hinton et al. ............ 726/2 |
| 2006/0206834 A1 | 9/2006 | Fisher et al. |
| 2007/0245013 A1* | 10/2007 | Saraswathy et al. .......... 709/223 |
| 2009/0193508 A1* | 7/2009 | Brenneman et al. ............ 726/9 |
| 2009/0249440 A1* | 10/2009 | Platt et al. ............ 726/1 |
| 2010/0125612 A1* | 5/2010 | Amradkar et al. ............ 707/802 |
| 2012/0011578 A1* | 1/2012 | Hinton et al. ............ 726/8 |
| 2012/0096271 A1* | 4/2012 | Ramarathinam et al. ...... 713/172 |
| 2012/0144034 A1* | 6/2012 | McCarty ............ 709/225 |
| 2012/0151568 A1* | 6/2012 | Pieczul et al. ............ 726/8 |

OTHER PUBLICATIONS

Frederick Chong, Gianpaolo Carraro, and Roger Wolter; "Multi-Tenant Data Architecture", MSDN (Microsoft Jun. 2006).*

Chang Jie Guo; Wei Sun; Ying Huang; Zhi Hu Wang; Bo Gao; "A Framework for Native Multi-Tenancy Application Development and Management," E-Commerce Technology and the 4th IEEE International Conference on Enterprise Computing, E-Commerce, and E-Services; pp. 551-558 (IEEE Jul. 26, 2007).*

Huang, Y.; Su, H.; Sun, W.; Zhang, J. M.; Guo, C. J.; Xu, J. M.; Jiang, Z. B.; Yang, S. X.; Zhu, J.; "Framework for building a low-cost, scalable, and secured platform for Web-delivered business services," IBM Journal of Research and Development, vol. 54, No. 6, pp. 4:1-4:14 (IBM Nov.-Dec. 2010).*

Poddar, I.; Goldszmidt, G.; , "Automated deployment and Aggregated access control for SOA composite applications," Integrated Network Management; pp. 833-847 (IEEE May 21, 2007).*

* cited by examiner

EFFICIENT SINGLE SIGN-ON AND IDENTITY PROVIDER CONFIGURATION AND DEPLOYMENT IN A DATABASE SYSTEM

CROSS-REFERENCE TO RELATED APPLICATION(S)

This application claims the benefit of U.S. provisional patent application Ser. No. 61/352,289, filed Jun. 7, 2010, and U.S. provisional application Ser. No. 61/315,776, filed Mar. 19, 2010. The entire content of these provisional applications is incorporated by reference herein.

TECHNICAL FIELD

Embodiments of the subject matter described herein relate generally to data processing systems and techniques, such as systems and processes that use a common network-based platform to support applications executing on behalf of multiple tenants. More particularly, embodiments of the subject matter relate to techniques, protocols, and methodologies for configuring and deploying single sign-on and identity provider features and functionality of a data processing system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In certain situations, a single user or operator of a multi-tenant database system might have legitimate credentials for login access to the applications and data of two or more different tenants. Traditionally, such a user would need distinct credentials (i.e., different usernames and/or different passwords) for each tenant. Some systems (including some multi-tenant database systems) utilize single sign-on (SSO) techniques to control access to multiple systems. For example, if a multi-tenant system implements an SSO technique, then a user that successfully logs into one system will also be given access to one or more other systems, depending upon how the SSO features for that user have been configured. In practice, the creation, setup, and configuration of SSO links between systems, organizations, and/or tenants can be time consuming, and often require the involvement of a system administrator or other technician.

Modern computing systems often use Security Assertion Markup Language (SAML) as a standard mechanism for implementing SSO features. In accordance with common practice, however, SAML-based SSO procedures require an identity provider, which is a processing module or logical construct that issues SAML assertions when an authenticated user of a first system initiates a SAML-based SSO procedure to gain access to a second system. In other words, the identity provider is the processing component of the first system that "guarantees" the identity of the user seeking access to the other system. Accordingly, before SSO can be supported by a system, an appropriate identity provider must be deployed for that system. In traditional systems, however, the process for creating an identity provider can be time consuming and vulnerable to human data entry errors.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to various user authentication techniques, protocols, procedures, and technology. The described subject matter can implemented in the context of any computer-implemented system, such as a software-based system, a database system, a multi-tenant environment, or the like. Moreover, the described subject matter could be implemented in connection with two or more separate and distinct computer-implemented systems that cooperate and communicate with one another.

In accordance with one aspect described below, an identity provider for a computer-implemented system is created and configured in a simplified and streamlined manner with very little end user involvement. Indeed, the exemplary embodiment described here employs a "single click" scheme that creates and configures an identity provider in response to only one user action.

In accordance with another aspect described below, an end user of a computer-implemented system can establish a single sign-on (SSO) link between two entities (e.g., two different tenants or organizations of a multi-tenant database system) in an efficient and simplified manner. Notably, the creation of the SSO link is bidirectional in nature, which means that the SSO link accommodates user navigation from a first system to a second system and vice versa. Moreover, the creation of the SSO link is accomplished without requiring the user to obtain, generate, or upload a personal digital certificate.

Figure 1:
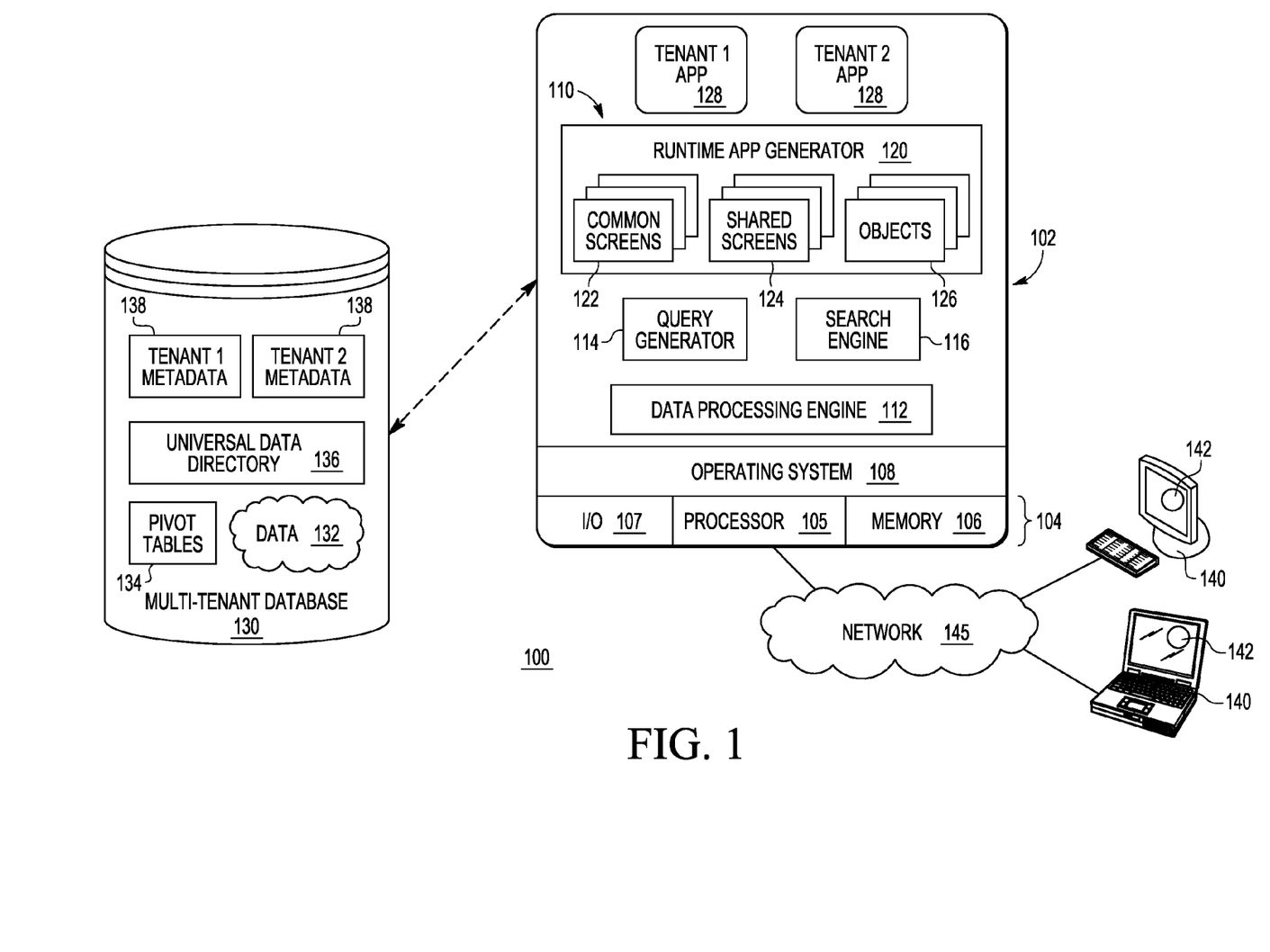
FIG. 1 is a block diagram of an exemplary multi-tenant data processing system.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant customer relationship management system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the client devices 140. The virtual applications 128 are typically generated at run-time in response to queries received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the various user authentication, SSO, identity provider configuration, and other techniques, processes, and methods described in more detail below with reference to FIGS. 2-6.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled client device 140 on the network 145. Typically, the user operates a conventional browser or other client program 142 to contact the server 102 via the network 145 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the client device 140; other embodiments may simply provide dynamic web or other content that can be presented and viewed by the user, as desired.

Figure 2:
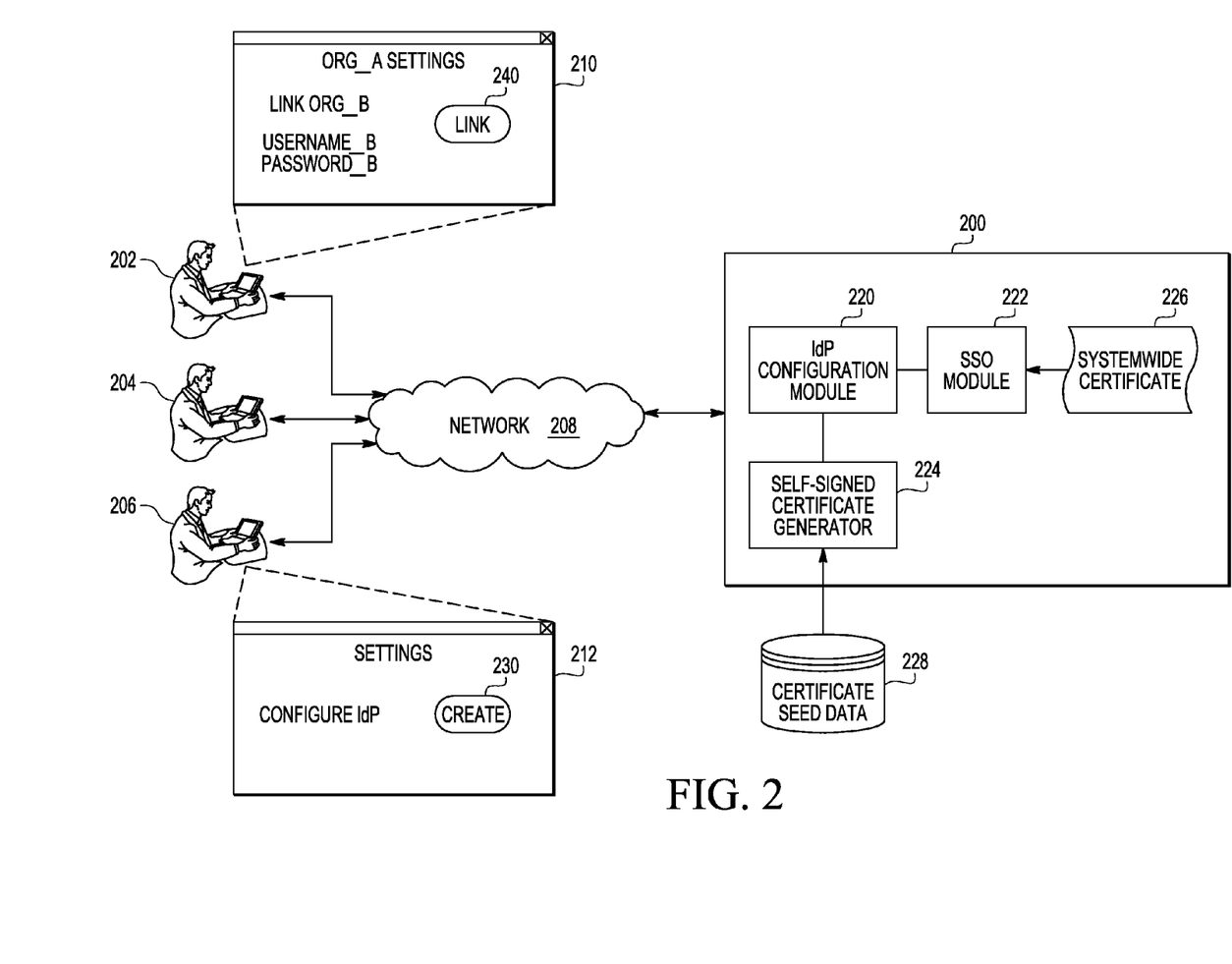
FIG. 2 is a block diagram that illustrates processing modules and elements of a database system that can be used to perform certain processes and procedures related to user authentication.

FIG. 2 is a block diagram that illustrates processing modules and elements of a database system 200 that can be used to perform certain processes and procedures related to user authentication, SSO, etc. Although not depicted in FIG. 2, the database system 200 could be deployed in the context of a multi-tenant application system, such as the system 100. Moreover, FIG. 2 depicts functional modules that might be realized using, for example, one or more processors, a data processing engine, or other computer-implemented logic resident at the database system 200. FIG. 2 illustrates an exemplary network deployment of the database system 200, where three different users 202, 204, 206 have access to the database system 200 via a data communication network 208. In a multi-tenant database system deployment, the users 202, 204, 206 may be users of the same tenant or users of two or three different tenants.

FIG. 2 depicts the user 202 accessing an exemplary webpage 210 (or other suitable graphical user interface) that enables the user 202 to create an SSO link between a first system, tenant, or organization (labeled ORG_A) and a second system, tenant, or organization (labeled ORG_B), while the user 202 is logged into the first tenant. FIG. 2 also depicts the user 206 accessing an exemplary webpage 212 (or other suitable graphical user interface) that enables the user 206 to quickly and easily create and configure an identity provider (IdP) for a tenant. These functions and the content of the exemplary webpages 210, 212 will be described in greater detail below.

The illustrated embodiment of the database system 200 generally includes, without limitation: an IdP configuration module 220; an SSO module 222; and a self-signed certificate generator 224. These functional modules of the database system 200 are operatively associated with one another, and may be coupled together using any suitable interconnection arrangement or architecture that accommodates data communication as needed. It should be appreciated that FIG. 2 depicts a "full featured" implementation of the database system 200 that supports various features and functions related to user authentication. A practical implementation of the database system 200 need not include or support all of the illustrated elements and all of the described functionality.

As depicted in FIG. 2, the SSO module 222 may access, maintain, or otherwise cooperate with a systemwide digital certificate 226. Moreover, the self-signed certificate generator 224 may access, maintain, or otherwise cooperate with certificate seed data 228. Referring again to FIG. 1, the systemwide digital certificate 226 could be stored as part of the data 132 or within the memory 106, as appropriate for the particular embodiment. In certain embodiments, the certificate seed data 228 includes descriptive data for one or more entities, tenants, organizations, and/or companies supported by the database system 200. Accordingly, the certificate seed data 228 could be realized as tenant-specific metadata 138 (see FIG. 1). Alternatively or additionally, the certificate seed data 228 could be stored as part of the data 132 or within the memory 106 if so desired.

The IdP configuration module 220 (which may be realized as software, firmware, processing logic, or the like) is a functional module that is responsible for configuring the system 200 for use as an IdP. Thus, the IdP configuration module 220 allows the system 200 to act as an IdP by providing the proper code to create SAML assertions, as described in more detail below. For example, in a multi-tenant database system environment, each tenant could have at least one IdP associated therewith. In practice, however, IdPs need not be configured and deployed by default for all tenants. Accordingly, the IdP configuration module 220 is used when a user of a tenant (e.g., a system administrator) requests the creation of an IdP for that particular tenant. In certain embodiments, the IdP configuration module 220 uses self-signed digital certificates produced by the self-signed certificate generator 224. The self-signed certificate generator 224 is suitably configured to produce digital certificates that are deemed to be trusted by the database system 200 without any third party verification or validation. In other words, the IdP configuration module 220 need not rely on digital certificates issued by an independent third party. The creation, configuration, and deployment of an IdP are explained in more detail below with reference to FIG. 3 and FIG. 4.

The SSO module 222 (which may be realized as software, firmware, processing logic, or the like) is a functional module that is responsible for the various SSO related features, protocols, and operations described here. Although not always required, certain embodiments of the SSO module 222 are compatible with Security Assertion Markup Language (SAML). As is well understood, SAML is an XML-based standard for exchanging authentication and authorization data between an IdP (which produces and issues SAML assertions) and a receiving system, entity, service provider, or the like. The SSO module 222 may cooperate with the IdP configuration module 220 such that the SSO module 222 can receive, manage, process, regulate, and/or otherwise control the IdPs supported by the database system 200. For the exemplary embodiments presented here, the SSO module 222 also handles the creation, configuration, and use of SSO links between organizations (tenants) supported by the database system 200. The creation, configuration, and deployment of SSO links are explained in more detail below with reference to FIG. 5 and FIG. 6.

The SSO module 222 uses the systemwide digital certificate 226 for certain operations. The systemwide digital certificate 226 may be realized as a text file (having any suitable format) that is internally used by the database system 200. Notably, the systemwide digital certificate 226 may be a cross-tenant and/or a cross-user certificate. In preferred embodiments, the systemwide digital certificate 226 is both cross-tenant and cross-user. In other words, the SSO module 222 uses the same systemwide digital certificate 226 regardless of which tenant or organization requires its use, and regardless of which user requires its use. The following description elaborates on how the database system 200 uses the systemwide digital certificate 226.

Figure 3:
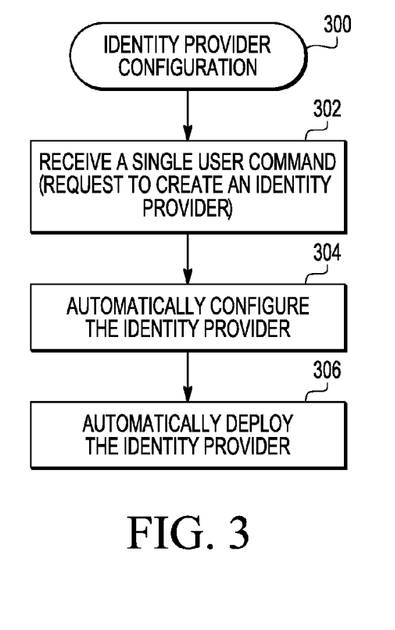
FIG. 3 is a flow chart that illustrates an exemplary embodiment of an identity provider configuration process.

As mentioned above, the IdP configuration module 220 enables the database system 200 to produce, configure, and deploy an IdP on demand. In this regard, FIG. 3 is a flow chart that illustrates an exemplary embodiment of an identity provider configuration process 300. The various tasks performed in connection with an illustrated process may be performed by software, hardware, firmware, or any combination thereof. For illustrative purposes, the following description of illustrated processes may refer to elements mentioned above in connection with FIG. 1 and FIG. 2 In practice, portions of a described process may be performed by different elements of a system, e.g., a processor, a data processing engine, or any functional or operating module thereof. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the respective process as long as the intended overall functionality remains intact.

The process 300 represents one exemplary embodiment of a method of deploying an IdP service for a computer-implemented system. This description assumes that the process 300 is initiated by an end user of a particular organization supported by the database system (although applicable to a multi-tenant environment, the host system need not be a multi-tenant system). This embodiment of the process 300 begins by receiving a user command or request to create, establish, or configure an IdP (task 302). For this exemplary embodiment, the user command corresponds to a single action or activity recorded at the user's terminal or computer, e.g., a "single click" of a graphical user interface (GUI) element displayed on a webpage. In response to the user command, the process 300 automatically configures the desired IdP at the computer-implemented system (task 304). For this embodiment, the IdP is produced solely in response to the single user command. In other words, the IdP is configured without obtaining or processing any additional user commands, user instructions, or user-entered data at the system (other than the original user command). This makes deployment and configuration of the IdP very quick and user-friendly. After configuring the IdP in this manner, the process 300 continues by automatically deploying the IdP service to allow the system to publish electronic identity information for the users of the organization for which the IdP service has been configured (task 306). Notably, the IdP service is configured and deployed in response to the single user command, and without obtaining or processing any additional user commands, user instructions, or user-entered data at the system (other than the original user command).

The process 300 depicted in FIG. 3 has been simplified for ease of description and to present the general concept in a compact manner. Additional details will be provided with reference to FIG. 4, which is a flow chart that illustrates an exemplary embodiment of an identity provider configuration/use process 400. The process 400 represents one exemplary embodiment of a computer-implemented method of publishing electronic identity information for a user. This description assumes that the process 400 is initiated by an end user of a particular organization supported by the database system (although applicable to a multi-tenant environment, the host system need not be a multi-tenant system). This embodiment of the process 400 begins by authenticating the user (task 402) to verify that the user has legitimate rights to configure an IdP. Assuming that the user is authenticated, the system will allow the user to proceed as needed.

Figure 4:
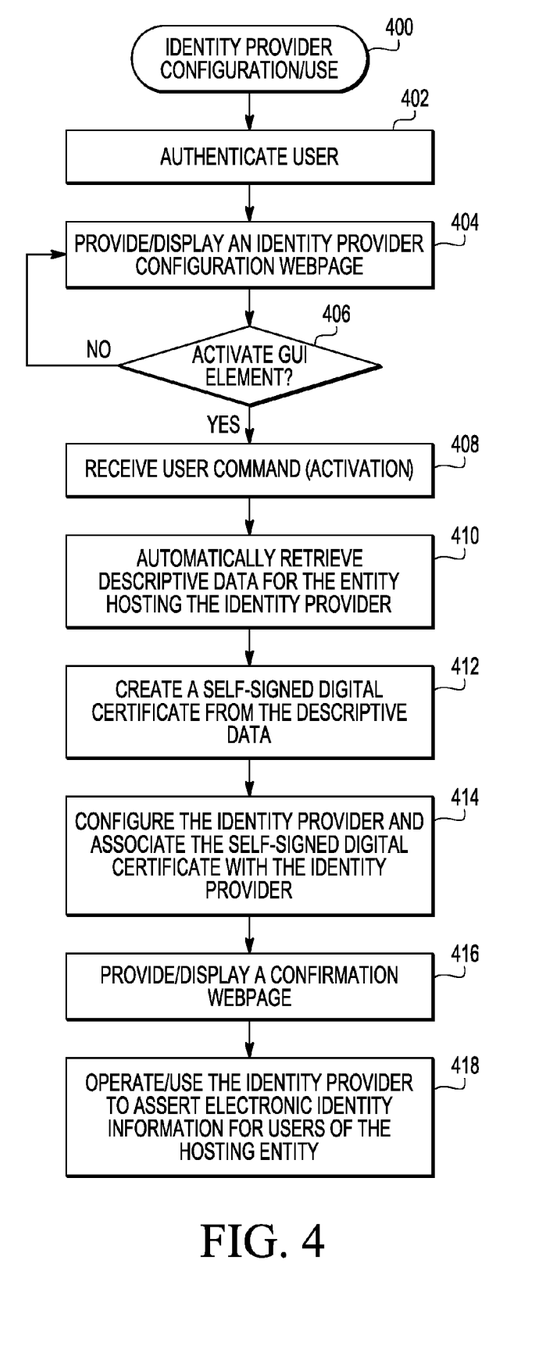
FIG. 4 is a flow chart that illustrates an exemplary embodiment of an identity provider configuration/use process.

Although not required, this embodiment of the process 400 assumes that the system provides GUIs for presentation at the user's terminal or computer. Thus, the user can navigate to and interact with one or more GUIs to configure an IdP. In this regard, the process 300 may provide an appropriate markup language document (e.g., an HTML document that defines a webpage) for presentation to the user. For example, the process 300 may provide and/or display an IdP configuration webpage that facilitates end user creation of an IdP (task 404). Referring back to FIG. 2, for example, the database system 200 is providing the webpage 212 to the user 206; this webpage 212 represents a "Settings" page that allows the user 206 to configure an IdP. Although not shown, the webpage 212 may allow the user 206 to view and/or change other settings related to the system or organization to which the user 206 has authorized access. In preferred embodiments, the IdP configuration webpage 212 includes an active GUI element 230 rendered thereon that, when selected by the user, initiates the IdP creation procedure. User activation of the GUI element 230 represents the "single-click" action that causes the database system 200 to generate and configure an IdP.

Referring back to FIG. 4, the process 400 checks for activation of the active GUI element (query task 406). Although not always required, the GUI element will typically be activated by the user. If the user does not select the GUI element, then the process 400 may exit or return to task 404 to continue presenting the IdP configuration webpage. If, however, the active GUI element is activated, then the system will receive a user command that indicates activation of the GUI element (task 408). For this example, the user command is issued in response to activation of the GUI element by the user.

In response to receiving the user command, and without requiring any additional user commands, user instructions, or user-entered data, the process 400 continues by creating the desired IdP service. The illustrated example of the process 400 configures the IdP service by automatically retrieving descriptive data for the entity hosting the IdP service (task 410). Notably, task 410 is performed by the system without any user involvement and, preferably, without user knowledge of the data retrieval. In this regard, the user need not enter any information or otherwise provide any data to support the generation of the IdP.

The process 400 continues by creating a self-signed digital certificate from at least some of the retrieved descriptive data (task 412). In this regard, the descriptive data may be considered to be "seed" data for the self-signed digital certificate. Referring again to FIG. 2, the self-signed certificate generator 224 obtains such certificate seed data 228, which may be maintained by the database system 200. Some or all of the descriptive data could be used to populate certain data fields of the self-signed digital certificate. Alternatively or additionally, some or all of the descriptive data could be used to derive the content of the self-signed digital certificate (or the content of data fields thereof). For example, at least some of the descriptive data could be used to construct or derive a name or a label for the self-signed digital certificate. The descriptive data may relate to identifying characteristics, features, or aspects of the entity, system, or organization for which the IdP will be configured. In this regard, the descriptive data may include some or all of the following, without limitation: a name of the entity (e.g., a company name); an identification number or text string for the entity; the country in which the entity is located; the state, province, or region in which the entity is located; the city or town in which the entity is located; the address of the entity; the telephone number of the entity; or the like.

As described above, the self-signed digital certificate is generated internally by the system in a manner that need not require any third party validation, approval, or involvement. After obtaining the self-signed digital certificate, the process 400 configures the IdP and associates the self-signed digital certificate with the configured IdP (task 414). In this regard, each IdP supported by the system could have a different and unique self-signed digital certificate associated therewith. This example assumes that the IdP and its self-signed digital certificate are successfully configured. Accordingly, the process 400 may continue by providing another markup language document (e.g., an HTML document that defines a webpage) for presentation to the user. For example, the process 400 may provide and/or display a suitable confirmation webpage that confirms the successful configuration of the IdP service (task 416). In this regard, the previous webpage that was displayed to the user could be refreshed such that it includes an appropriate confirmation notification, e.g., a simple text message, a graphical "IdP Configured" icon, or the like.

At this time, the IdP has been configured and deployed for use. Thus, the process 400 may continue by operating and using the configured IdP service to assert electronic identity information for one or more users of the respective hosting entity or organization for which the IdP was configured (task 418). In practice, the IdP may also assert electronic identity information to third party systems. In certain embodiments, the IdP service issues SAML assertions when a user requests a SSO operation, such as a request to access a second organization while the user is currently logged into a first organization. Moreover, when issuing a SAML assertion, the IdP service includes the respective self-signed certificate with the assertion.

Once configured, the IdP allows a user to perform a single sign-on into a plurality of service providers, such as multiple tenants or organizations and/or "external" third party applications or entities that support SAML. The "single click" IdP configuration and deployment system described here is designed to allow easy one-click configuration and deployment of IdPs.

In accordance with one legacy IdP creation protocol, at least the following steps must be performed: (1) create one or more self-signed digital certificates by navigating to a particular setup screen, clicking a button to create a new self-signed certificate, providing human input (data entry) for the certificate fields, and clicking to generate and save the new certificate; and (2) choose the certificate to be associated with the new IdP by navigating to a particular IdP screen, clicking on an "Enable IdP" button, choosing a certificate to use from a picklist, and clicking the "Save" button to deploy the IdP. User feedback suggests that this legacy process is very complex, confusing, and time consuming as it involves following multiple steps on different pages and it requires the user to actually type in details.

In contrast, the approach presented herein automatically generates a self-signed certificate, associates it with the newly configured IdP, and deploys the IdP in a manner that is transparent to the user. This streamlined process involves just a single button click, and it does not require the user to use the keyboard for data entry. In certain embodiments, the user only needs to click on the "Enable Identity Provider" or "Create" button on the appropriate page or screen. This is all the user needs to do, and the IdP is configured and deployed automatically. The system automatically handles all the steps that would traditionally require manual effort (including the steps listed above for the traditional approach). Accordingly, the new approach requires virtually no user input (just clicking a button). Moreover, there is absolutely no decision making required on the part of the user, and the new procedure drastically reduces the amount of time taken to configure and deploy an IdP (it is nearly instantaneous). In addition, the process uses system metadata for making decisions about the certificate fields.

In accordance with certain implementations, the system dynamically uses the organization's metadata to construct various fields required for the self-signed certificate. For example, the system dynamically constructs a label and a unique name for the certificate using some text, and appends the current date to the certificate. Moreover, the certificate uses a 2048-bit key size for enhanced security. In accordance with one embodiment, the "CN" field in the certificate is set to the organization's name, the "OU" field is set to the organization identifier, and the "C," "ST," "L," and "O" fields are set to a common value for all certificates (e.g., C=USA, ST=CA, L=San Francisco, O=Salesforce.com). Next, the system creates a self-signed certificate using these fields. The certificate created has a lifetime of, for example, two years. Finally, the system associates the newly generated certificate with the organization's IdP and deploys the IdP.

An embodiment of a database system could utilize an IdP to accomplish SSO actions, and implement the IdP creation and configuration procedure described above. In certain situations, however, it may be desirable to support SSO operations without requiring setup of an IdP and without relying on a setup of a standard SSO protocol such as SAML. Accordingly, alternate embodiments of the database system need not follow the IdP creation and configuration procedure presented above. The following section of this description relates to such an alternate embodiment.

Figure 5:
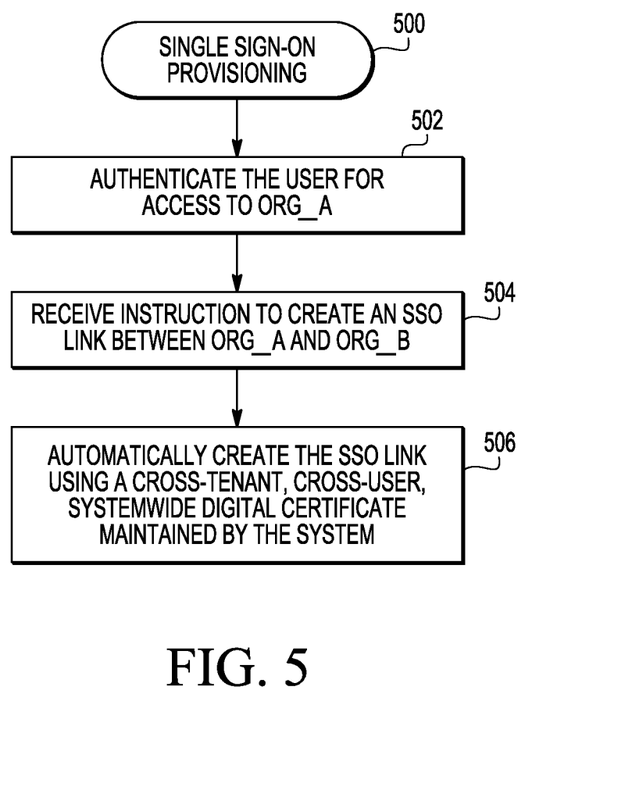
FIG. 5 is a flow chart that illustrates an exemplary embodiment of a single sign-on provisioning process.

As mentioned above with reference to FIG. 2, the SSO module 222 accommodates the establishment of SSO links between organizations supported by the database system 200 (where SSO links are user-specific). In this regard, FIG. 5 is a flow chart that illustrates an exemplary embodiment of a single sign-on provisioning process 500, which might be performed by the database system 200. The process 500 represents one exemplary embodiment of a method of establishing SSO capabilities for a given user of a database system, such as a multi-tenant database system of the type described above. This description assumes that the process 500 is initiated by an end user of a particular organization supported by the database system (although applicable to a multi-tenant environment, the host system need not be a multi-tenant system). This embodiment of the process 500 begins by authenticating the user for access to a first organization supported by the database system (task 502). For this description, the first organization is labeled ORG_A. This description assumes that the authentication of the user is successful, and that the process 500 has verified that the user has legitimate rights to provision SSO for the first organization.

The process 500 continues by receiving an appropriate instruction to create an SSO link for the designated user (task 504). For this example, the SSO link for that particular user is intended to be established between the first organization (ORG_A) and a second organization supported by the database system (ORG_B). For this exemplary embodiment, the instruction is issued while the user is an authenticated user of the first organization. Moreover, the instruction includes or otherwise identifies credential information for authenticating the user to the second organization. The credential information for the second organization enables the system to confirm that the user indeed has legitimate access rights to the second organization.

In practice, the SSO linking instruction might be generated in response to user interaction with the user's terminal or computer, e.g., manipulation of one or more active GUI elements displayed on a webpage. For example, the process 500 may provide and/or display an appropriate webpage that facilitates end user creation and configuration of SSO links between organizations. Referring back to FIG. 2, for example, the database system 200 is providing the webpage 210 to the user 202; this webpage 210 represents a "Settings" page for the first organization (ORG_A). This webpage 210 allows the user 204 to identify one or more organizations to be linked to the first organization (for simplicity, this example creates only one SSO link for this particular user 202: a link between ORG_A and ORG_B). The webpage 210 allows the user 202 (who is currently logged into ORG_A) to enter his or her credentials for ORG_B. In typical implementations, the user's credentials will include at least a username and password. For this reason, FIG. 2 depicts the webpage 210 after the user has entered his or her username for ORG_B (labeled USERNAME_B) and password for ORG_B (labeled PASSWORD_B). Although not shown, the webpage 210 may allow the user 204 to view and/or change other settings for the first organization. In preferred embodiments, the webpage 210 includes an active GUI element 240 rendered thereon that, when selected by the user, initiates the SSO linking procedure. User activation of the GUI element 240 causes the database system 200 to generate and configure the requested SSO link(s) for that particular user. Note that the SSO link is specific to the designated user; the SSO link does not enable arbitrary users of ORG_A to gain access to ORG_B, and vice versa.

Referring back to FIG. 5, in response to receiving the SSO link creation instruction, the process 500 automatically creates the requested SSO link (or links) using an internal systemwide digital certificate maintained by the system (task 506). Referring to FIG. 2, task 506 creates the SSO link using the systemwide digital certificate 226, which preferably applies across all tenants and across all users of the database system 200. In practice, the requested SSO link is created automatically by the system without processing or requiring any user-created, user-uploaded, user-assigned, or third-party created digital certificates. In certain implementations, the created SSO link is bidirectional in nature. In other words, the SSO link created by task 506 allows the user (if currently logged into ORG_A) to seamlessly navigate to ORG_B, and allows the user (if currently logged into ORG_B) to seamlessly navigate to ORG_A.

The process 500 depicted in FIG. 5 has been simplified for ease of description and to present the general concept in a compact manner. Additional details will be provided with reference to FIG. 6, which is a flow chart that illustrates another exemplary embodiment of an identity provider configuration process 600. The process 600 represents one exemplary embodiment of a SSO method for a computer-implemented database system, which may (but need not) be a multi-tenant database system. The process 600 assumes that the system maintains a suitably formatted systemwide digital certificate (which, is preferably a cross-tenant and a cross-user certificate) at, for example, a memory or other storage element (task 602). As mentioned previously, the system need not use more than one systemwide digital certificate to support the process 600.

Figure 6:
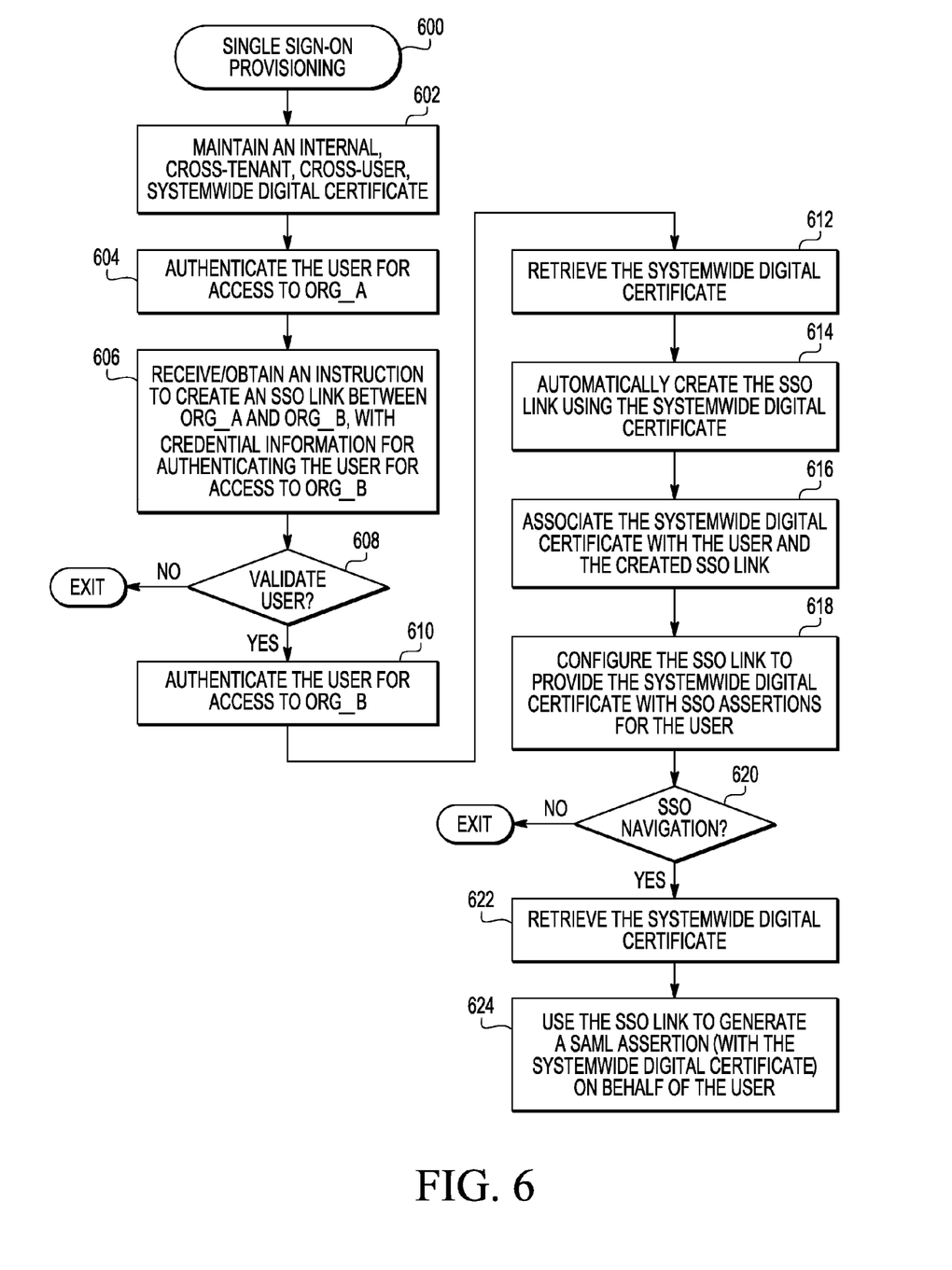
FIG. 6 is a flow chart that illustrates another exemplary embodiment of a single sign-on provisioning process.

This description assumes that the process 600 is initiated by an end user of a particular organization supported by the database system, and that the process 600 authenticates the user for access to a first organization (ORG_A) supported by the database system (task 604). Assuming that the user has successfully logged into ORG_A, the process 600 may continue by receiving or otherwise obtaining an instruction to create an SSO link between ORG_A and a second organization, ORG_B (task 606). As mentioned above, the instruction may include, identify, or be accompanied by credential information for authenticating the same user for access to ORG_B. In certain embodiments, creation of the SSO link between ORG_A and ORG_B is initiated by the user instruction (with the credentials for ORG_B) and in the absence of any additional user commands, user-entered data, or user involvement. In this regard, user activation of the GUI element 240 (see FIG. 2) might represent a "single-click" action that causes the process to automatically create and configure the requested SSO link.

After receiving the instruction and the user's credentials for ORG_B, the system checks and validates the received credential information (query task 608). If the system does not validate the user's credential information for ORG_B, then the process exits without creating the requested SSO link. If, however, the user is validated for ORG_B, then the process 600 continues. For example, the process 600 may authenticate the user for access to ORG_B to facilitate the creation and configuration of the desired SSO link (task 610). In addition, the process 600 retrieves the systemwide digital certificate (task 612) and automatically creates the requested SSO link between ORG_A and ORG_B, using the retrieved systemwide digital certificate (task 614), in the manner described above for the process 500.

The process 600 may also associate the systemwide digital certificate with the authenticated user and/or with the newly created SSO link (task 616) and configure the SSO link such that the systemwide digital certificate is included or otherwise provided with SSO assertions for the user (task 618). In this regard, when the user desires to navigate from ORG_A to ORG_B, the systemwide digital certificate is used in connection with the SSO assertion issued by the IdP associated with ORG_A. Likewise, the same systemwide digital certificate is used in connection with SSO assertions issued by the IdP associated with ORG_B. At this time, the system can support SSO actions between ORG_A and ORG_B (for this particular user). For example, the process 600 might continue by monitoring for a user command to navigate from an authenticated state in a first organization to a second organization. Thus, if the process 600 detects or obtains a suitably formatted SSO navigation command (query task 620), it may continue by retrieving the systemwide digital certificate that is associated with the respective SSO link (task 622) and generating an appropriate SSO assertion for the second organization (task 624). It should be appreciated that the SSO link is used or accessed to generate the SSO assertion. More specifically, the information associated with the SSO link (e.g., identifying information for ORG_B and the username of the user for ORG_B, if the link is from ORG_A to ORG_B) is used to construct the SSO assertion and to determine where it should be sent to properly authenticate the use for access to ORG_B. In certain embodiments, the SSO assertion generated at task 624 will be a SAML assertion, which is issued on behalf of the user as an authenticated user of the first organization. The SAML assertion will include, identify, point to, or otherwise indicate the systemwide digital certificate such that the entity or service provider that receives the SAML assertion will treat the received SAML assertion in a trusted manner.

In contrast to traditional configuration procedures that create SSO links between organizations with significant overhead for setup, the techniques and procedures described above allow users to set up organization-to-organization SSO links for themselves without any administrative setup, without any need to download a certificate in one organization and upload in another, without the need for an organization to be configured to support SAML, and without the need to have the organization enabled for use as an IdP. That said, the SSO link configuration procedure presented here remains compatible with legacy processes that employ SAML and an IdP.

Using traditional procedures, setting up organization-to-organization SSO is a complicated process that requires administrator intervention on both organizations that need to be linked. In addition, there are several other limitations: (1) the target organization can only be linked to one source organization at any one time, due to support of only one inbound SAML configuration; (2) setting up organization-to-organization SSO means that the target organization cannot have SSO from other sources (such as a centralized IdP that the organization maintains); (3) the SSO link is a one-way link, and it cannot be used to perform SSO from the target organization back to the source organization; (4) there is administrative overhead incurred in populating the "Federation ID" of every user in one of the two organizations. Creation of new users requires the field to be populated for them as well, or organization-to-organization SSO will fail; (5) the source organization must have some way of accessing the IdP feature; (6) the link is between organizations, not users, therefore allowing even just one user to perform SSO into another organization requires the entire organization to be set up properly.

The general goal of the new approach is to allow users to visit a page, enter their username and password for a different organization that they want linked, and create an SSO link. Subsequently, the user will be able to click a link from either organization and automatically be signed in to the other one. This will not require administrator intervention to set up SAML. Indeed, it doesn't even require SAML to be enabled and configured in the organization. Moreover, there is no limit (or a reasonable limit if deemed necessary) to the number of other users a given user can be linked to. All that is required is the username and password of the target. A user can be linked to other users in the same organization, users in different organizations, and users on different instances.

For simplicity, the user in the original organization will be referred to as "User A" and the username that they are linking to in another organization is "User B." The backend will be based on an existing SAML implementation. An internal certificate and private key can be used to sign organization-to-organization SAML Responses. The audience will be different to denote that these are organization-to-organization assertions. When an entity receives such an assertion, it will validate it using the known certificate and then perform a normal SAML login as User B.

Setting up the SSO link will simply be a cross-instance call that validates User B's credentials (entered by User A). If the credentials validate properly, the link between the two users will be saved in a new database table (core.org_to_org_saml or something similar) in User B's instance (as User B→User A) and returned through the XI call, where the link will also be saved on User A's instance (as User A→User B). This basically means that links will be symmetric so that the user can move back and forth between the two organizations freely.

A new UI will be built that will query this table and display all of the links for the current user. These links can be used with a new servlet that will use the internal certificate and private key to generate a valid SAML Response and send it to the right instance, where the user will be logged in. The SAML assertion will include a few extra attributes such as the original user (User A) and original ORG_ID for validation purposes. Assertions will be generated with the USER_ID as the subject. This is because usernames can change, and the system should protect against links becoming invalid due to such changes. The SAML login code can be modified to correctly parse these assertions. Alternately, the USER_ID could be used as an attribute.

The existence of the link should be validated on both ends to ensure that the organization-to-organization sign on was permitted (utilizing the extra attributes in the assertion). In addition, links can be removed at any time. Doing so will revoke both ends of the link (remove it from the table on both instances).

The following database schema could be used with certain implementations. This schema is merely one suitable example, and it is not intended to limit or restrict the application or scope of the embodiments presented here.

```
core.org_to_org_saml
  org_id - CHAR(15) - current user's org id for standard partitioning
  org_to_org_saml_id - CHAR(15) - entity ID for standard index
  user_id - CHAR(15) - current user ID for querying of links for a user
  target_org_id - CHAR(15) - org ID of the target org
  target_user_id - CHAR(15) - user ID of the target user
  created_by - CHAR(15) - user ID of the user that created this link (for audit purposes)
  name - VARCHAR2(256) - a friendly name for this link so the UI shows more than
the target user id and org id (cannot be changed after creation to simplify XI issues)
```

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of establishing single sign-on capabilities in a multi-tenant database system, the multi-tenant database system supporting a plurality of users and a plurality of tenants, the method comprising:
    maintaining a common systemwide digital certificate at the multi-tenant database system, wherein the common systemwide digital certificate is configured for use with all of the plurality of users and for all of the plurality of tenants supported by the multi-tenant database system to create single sign-on links between different tenants of the plurality of tenants;
    receiving, by the multi-tenant database system, a first instruction to create, for a first user of the multi-tenant database system, a first single sign-on link between a first organization of the multi-tenant database system and a second organization of the multi-tenant database system, the first instruction identifying credential information for authenticating the first user to the second organization;
    in response to receiving the first instruction, using the common systemwide digital certificate to cause the multi-tenant database system to create the first single sign-on link for the first user;
    receiving, by the multi-tenant database system, a second instruction to create, for a second user of the multi-tenant database system, a second single sign-on link between a third organization of the multi-tenant database system and a fourth organization of the multi-tenant database system, the second instruction identifying credential information for authenticating the second user to the fourth organization; and
    in response to receiving the second instruction, using the common systemwide digital certificate to cause the multi-tenant database system to create the second single sign-on link for the second user; wherein the first and second single sign-on links are created without processing a user-assigned digital certificate.

2. The method of claim 1, further comprising authenticating the first user to the first organization, wherein receiving the first instruction occurs after authenticating the first user to the first organization and while the first user is an authenticated user of the first organization.

3. The method of claim 1, wherein the multi-tenant database system creates the first single sign-on link in response to receiving the first instruction and without processing any additional user commands, user instructions, or user-entered data.

4. The method of claim 1, wherein the first single sign-on link for the user is bidirectional between the first organization and the second organization.

5. The method of claim 1, further comprising:
    associating the common systemwide digital certificate with the first user and the first single sign-on link; and
    configuring the first single sign-on link such that the common systemwide digital certificate is provided with single sign-on assertions for the first user between the first organization and the second organization.

6. The method of claim 1, further comprising:
    after creating the first single sign-on link, obtaining a user command to navigate from an authenticated state in the first organization to the second organization;

in response to the user command, generating a Security Assertion Markup Language (SAML) assertion on behalf of the first user, using the first single sign-on link;

retrieving the systemwide digital certificate; and including the systemwide digital certificate with the SAML assertion.

7. A single sign-on method for a computer-implemented multi-tenant database system that supports a plurality of users and a plurality of organizations, the method comprising:

authenticating, by a processor of the database system, a first user to a first organization supported by the database system;

thereafter, receiving, at the database system, credential information for authenticating the first user to a second organization supported by the database system;

obtaining at the database system a first user instruction to link, for the first user, the first organization to the second organization;

in response to receiving the first user instruction, and without requiring a user-assigned digital certificate, creating, by the processor of the database system, a first single sign-on link for the user between the first organization and the second organization, wherein the first single sign-on link is created using a common systemwide digital certificate that applies to all of the plurality of users and to all of the plurality of organizations supported by the database system to create single sign-on links between different organizations of the database system;

authenticating, by the processor of the database system, a second user to a third organization supported by the database system;

thereafter, receiving, at the database system, credential information for authenticating the second user to a fourth organization supported by the database system;

obtaining at the database system a second user instruction to link, for the second user, the third organization to the fourth organization;

in response to receiving the second user instruction, and without requiring a user-assigned digital certificate, creating, by the processor of the database system, a second single sign-on link for the second user between the third organization and the fourth organization, wherein the second single sign-on link is created using the common systemwide digital certificate.

8. The method of claim 7, wherein the first single sign-on link is bidirectional between the first organization and the second organization.

9. The method of claim 7, wherein creating the first single sign-on link is initiated by the first user instruction and in the absence of any additional user commands or user-entered data.

10. The method of claim 7, further comprising validating the credential information for authenticating the first user to the second organization, wherein creating the first single sign-on link is performed in response to the validating.

11. The method of claim 7, further comprising:

after creating the first single sign-on link, obtaining a user command to navigate from an authenticated state in the first organization to the second organization; and in response to the user command, generating a single sign-on assertion for the second organization using the first single sign-on link.

12. The method of claim 11, wherein generating the single sign-on assertion comprises issuing a Security Assertion Markup Language (SAML) assertion on behalf of the first user.

13. The method of claim 12, wherein the SAML assertion contains the common systemwide digital certificate.

14. A computer-implemented multi-tenant database system comprising a processor and a memory, wherein the database system supports a plurality of users and a plurality of organizations, and wherein the memory comprises computer-executable instructions that, when executed by the processor, cause the computer system to:

authenticate a user for access to a first organization supported by the database system;

receive a first instruction to create a first single sign-on link for the user between the first organization and a second organization supported by the database system, wherein the first instruction is issued while the user is an authenticated user of the first organization, and wherein the first instruction includes or identifies credential information for authenticating the user to the second organization;

in response to receiving the first instruction, create the first single sign-on link using an internal systemwide digital certificate that is configured for common use with all of the plurality of users supported by the database system and with all of the plurality of organizations supported by the database system, and without processing any user-created, user-uploaded, or user-assigned digital certificates;

receive a second instruction to create a second single sign-on link for the user between the first organization and a third organization supported by the database system, wherein the second instruction is issued while the user remains an authenticated user of the first organization, and wherein the second instruction includes or identifies credential information for authenticating the user to the third organization; and in response to receiving the second instruction, create the second single sign-on link using the internal systemwide digital certificate, and without processing any user-created, user-uploaded, or user-assigned digital certificates.

15. The computer-implemented multi-tenant database system of claim 14, wherein the computer-executable instructions cause the computer-implemented multi-tenant database system to create a bidirectional single sign-on link between the first organization and the second organization.

16. The computer-implemented multi-tenant database system of claim 14, wherein the computer-executable instructions cause the computer-implemented multi-tenant database system to validate the credential information for authenticating the user to the second organization, wherein creating the first single sign-on link is performed after the validating.

17. The computer-implemented multi-tenant database system of claim 14, wherein the computer-executable instructions cause the computer-implemented multi-tenant database system to:

associate the internal systemwide digital certificate with the user and the first single sign-on link; and configure the first single sign-on link such that the internal systemwide digital certificate is provided with single sign-on assertions for the user between the first organization and the second organization.

* * * * *